April 19, 1949.  M. GENGELBACH  2,467,617
POWER SCOOP OR SHOVEL FOR TRACTORS
Filed Aug. 20, 1945  4 Sheets-Sheet 1

INVENTOR.
MAURICE GENGELBACH,
BY
Chas W Gerard,

April 19, 1949.  M. GENGELBACH  2,467,617
POWER SCOOP OR SHOVEL FOR TRACTORS
Filed Aug. 20, 1945  4 Sheets-Sheet 2

INVENTOR.
MAURICE GENGELBACH,
BY Chas. W. Gerard.

April 19, 1949.     M. GENGELBACH     2,467,617
POWER SCOOP OR SHOVEL FOR TRACTORS
Filed Aug. 20, 1945     4 Sheets-Sheet 3
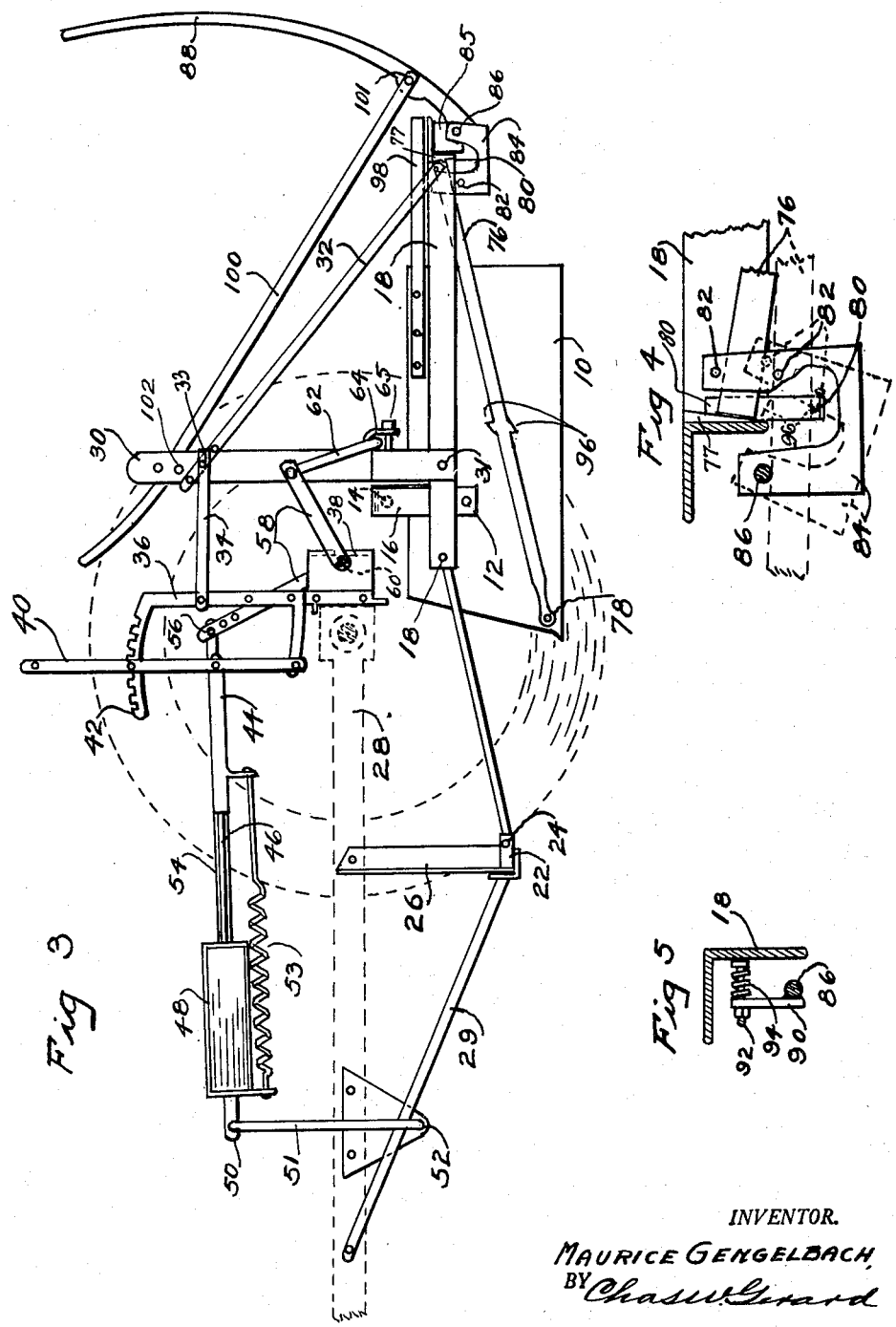
INVENTOR.
MAURICE GENGELBACH,
BY Chas W Gerard April 19, 1949.  M. GENGELBACH  2,467,617
POWER SCOOP OR SHOVEL FOR TRACTORS
Filed Aug. 20, 1945  4 Sheets-Sheet 4

INVENTOR.
MAURICE GENGELBACH,
BY Chas. W. Girard

Patented Apr. 19, 1949

2,467,617

UNITED STATES PATENT OFFICE 2,467,617

POWER SCOOP OR SHOVEL FOR TRACTORS

Maurice Gengelbach, Plattsburg, Mo.

Application August 20, 1945, Serial No. 611,567

6 Claims. (Cl. 37—126)

1

The present invention relates to material handling equipment, with particular reference to power shovel or scoop apparatus designed to be mounted for operation upon regular or conventional forms of farm tractors, and also adapted to be readily and conveniently operated and controlled by the driver of such tractor equipment.

Accordingly an object of the invention is to provide apparatus of this character which comprises a shovel or scoop member mounted in framework adapted to be attached to the tractor, and including connections whereby the shovel or scoop is operated by a thrust action which is imparted or transmitted from the rear of the shovel and applied thereto at the front or digging margin of the shovel.

The shovel or scoop member and its supporting connections are furthermore so arranged as to provide for raising or lowering movement of the shovel by the operation of suitable hydraulic connections, as hereinafter described.

A further object of the invention is to provide an arrangement and construction whereby the supporting means or connections for the shovel or scoop member include means for conveniently adjusting or regulating the operative level of the shovel as may be required for controlling and modifying its working position to suit varying conditions.

It is a still further object of the invention to provide apparatus of this character in which the shovel or scoop member is effectively secured and latched in normal working or material-receiving position, but is further provided with means operative either from the driver's position or from a point at the rear of the apparatus, for releasing the shovel from such securing or latching means and permitting the shovel to execute a dumping operation by a rocking movement within its supporting framework.

With the foregoing general objects in view, as well as various minor objects as will hereinafter appear, the invention will now be described by reference to the accompanying drawings illustrating one form of construction which has been found desirable and efficient for the embodiment of the proposed improvements, after which those features and combinations deemed to be novel and patentable will be particularly set forth and claimed.

In the accompanying drawings—

Figure 3 is a similar view of the construction, showing said shovel or scoop member after being operated by its control connections into a raised position;

Figures 4 and 5 are enlarged sectional detail views, illustrating the latching or shovel securing means hereinafter described;

Figure 6:
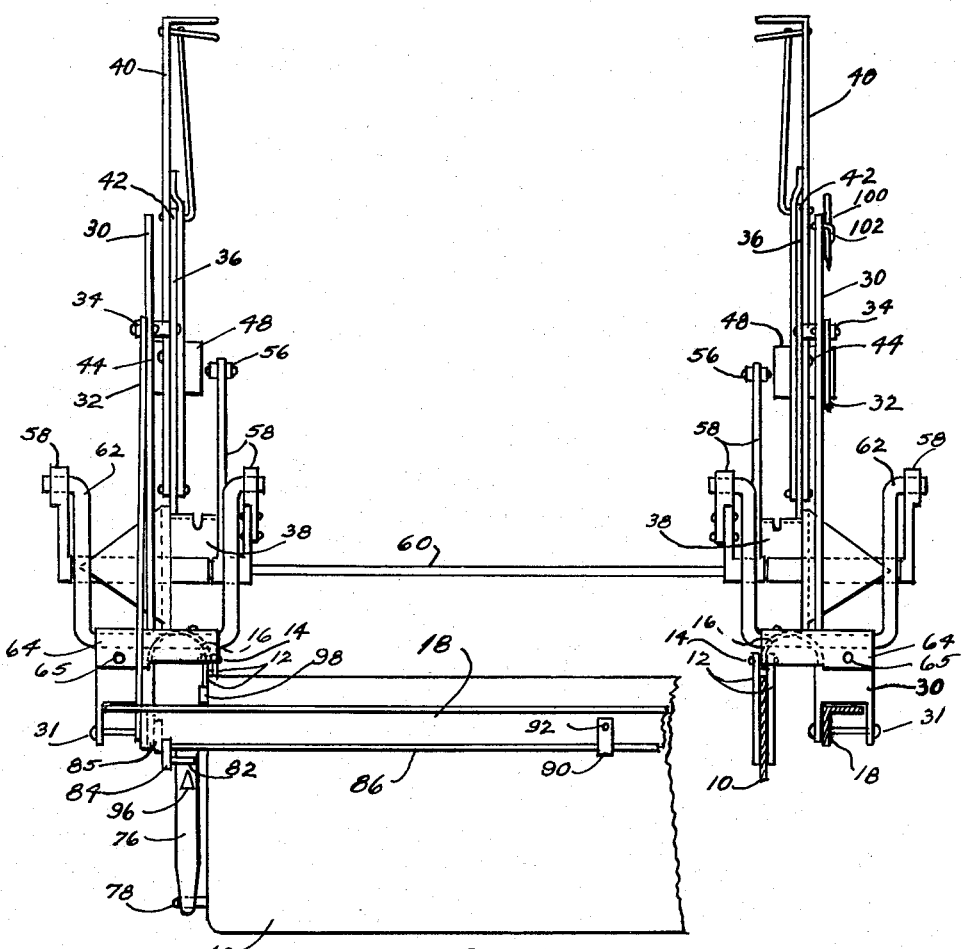
Figure 7:
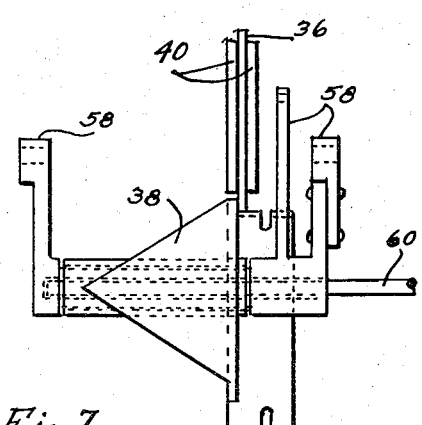

Figure 6 is a rear elevation of the apparatus, with portions at the right thereof broken away and in section for clearer illustration of the construction of the remaining parts; and Figure 7 is a detail elevation (on a larger scale) showing one of the frame pieces for supporting the bell crank assembly to which are secured the shovel or scoop lifting connections (the latter being omitted from said view).

Referring now to the accompanying drawings in detail, the improved apparatus is illustrated as comprising a shovel or scoop member 10 having plates 12 secured to its opposite sides and near the front of the shovel, and these plates project somewhat above the shovel for engaging pivots 14 projecting inwardly from bracket members 16 which are mounted on the front ends of a U-shaped angle bar frame 18. The front ends of this frame 18 are pivotally connected with drag links 20 extending forward to brackets 22 which provide pivotal connections (as indicated at 24) with upright frame pieces 26 which are rigid with the chassis frame 28 of a tractor and are also provided with brace connections therewith, as illustrated at 29 in Figures 2 and 3.

Figure 1:
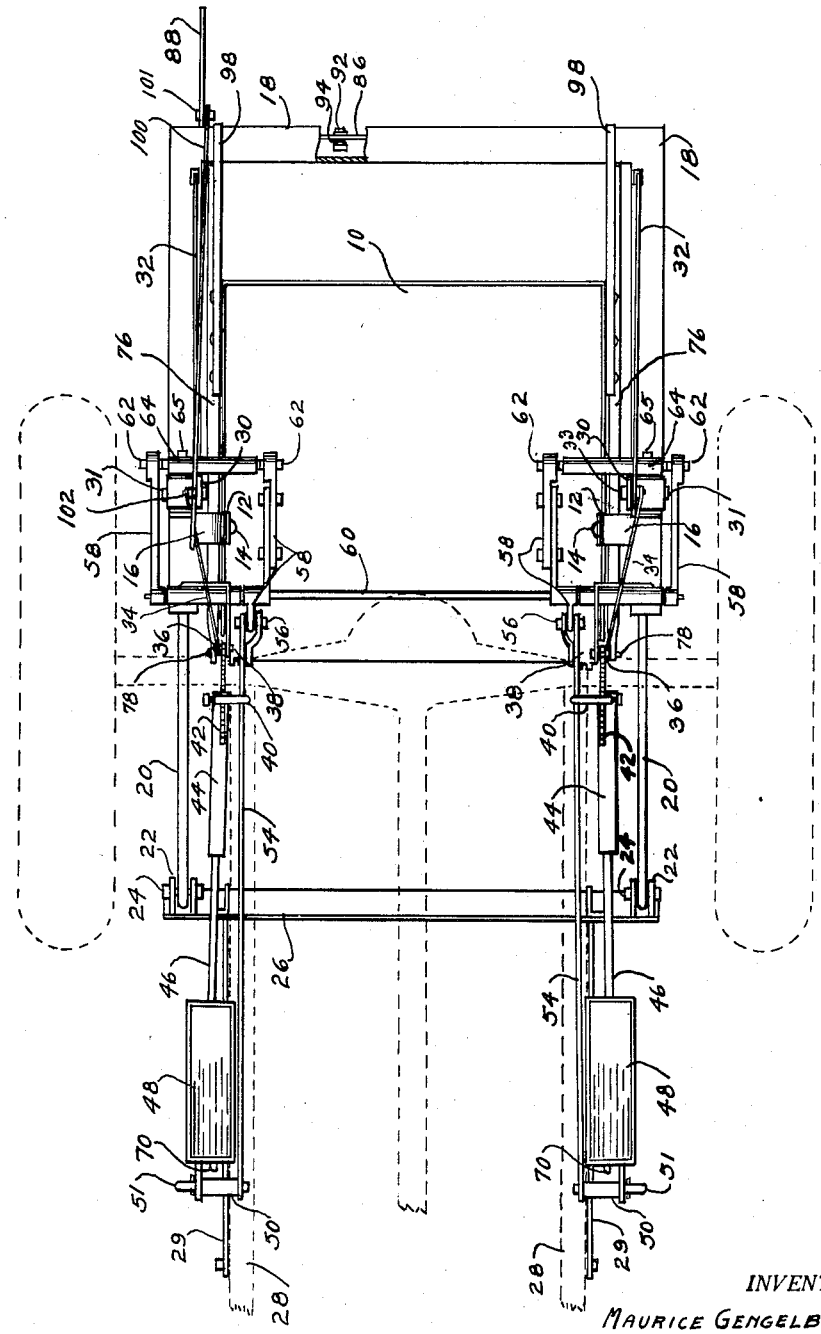
Figure 1 is a plan view illustrating a power shovel and connections for tractor equipment and embodying the improved features comprising the present invention.
Figure 2:
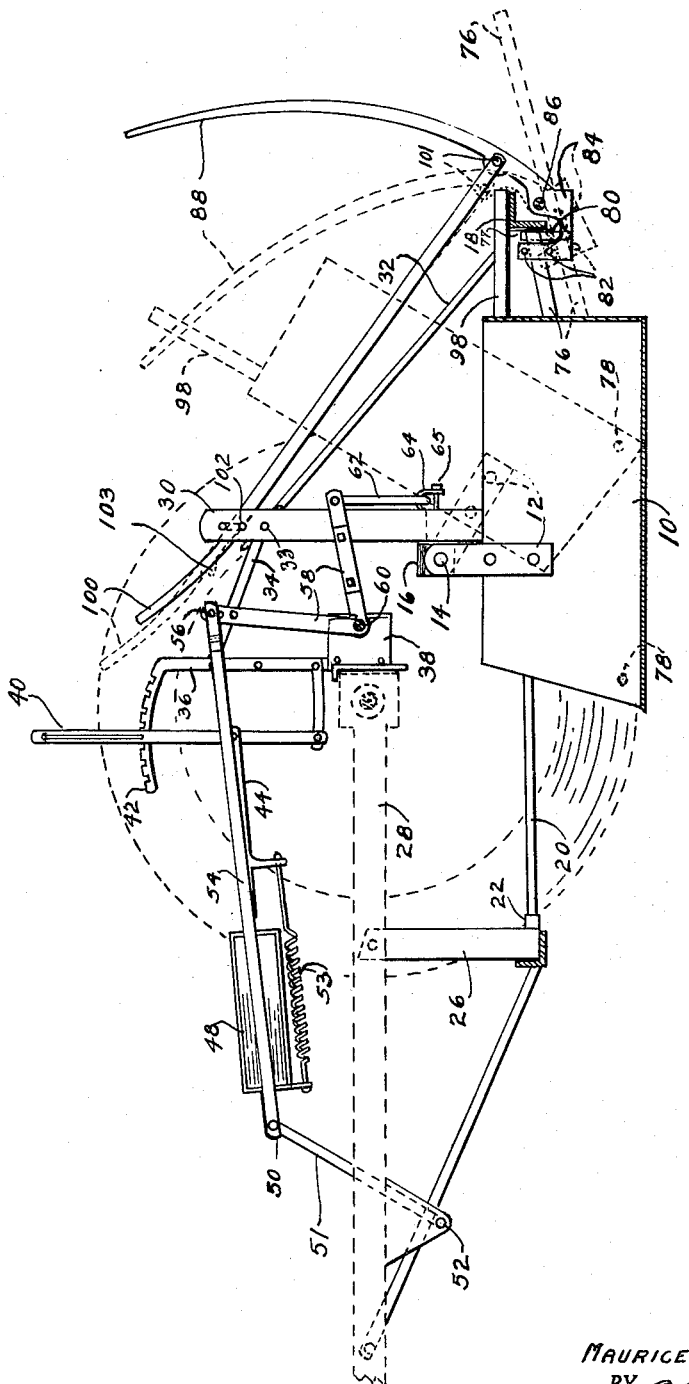
Figure 2 is a sectional elevation of the same, with dotted lines representing the scoop or shovel member operated into dumping position.

The U-shaped shovel-carrying frame 18 is provided with a pair of upright posts 30 at its opposite sides and loosely pivoted thereto as indicated at 31. The upper portions of said posts 30 are reduced to slender bar form and have their upper ends adjustably connected (as indicated at 33) to brace members 32 which extend rearwardly and are secured to the rear portion of the frame 18 (see Figure 1). The upper ends of the posts 30 are also connected by links 34 with a pair of U-shaped bracket members 36 supported by rigid frame pieces 38 which are attached to the tractor frame 28, as illustrated in Figures 2 and 3. Each of the bracket members 36 is provided with a hand lever 40 which is adapted to be adjustably secured in various positions along a ratchet arm 42, and is also connected by a link 44 with the plunger or piston rod 46 of a hydraulic cylinder 48. To the forward ends of the two hydraulic cylinders 48 are attached brackets 50, to which are pivotally connected the upper ends of suitable supporting links 51, the lower ends of which are fulcrumed upon brackets 52 carried by the frame 28 of the tractor, as illustrated in Figures 2 and 3. The forward end of each cylinder 48 is also provided with a suitable coil spring connection 53 with the corresponding bar or link 44, for stabilizing the working stroke and also facilitating the return movement of the piston or plunger at the end of each stroke.

To each of the brackets 50 is also connected a link 54, the opposite or rear end of which is adjustably connected (as indicated at 56) with one of the arms 58 of a bellcrank assembly which is secured to a rocker shaft 60 journaled in the frame pieces 38; and each of the bellcrank assemblies also comprises a pair of lifting arms which are connected by U-shaped lifting links 62, clips 64 and bolts 65 or the like to the lower portions of the aforesaid posts 30 (see Figures 2 and 3).

The operation of the shovel through the medium of the above-described connections, including the hydraulic cylinders 48, will serve to raise and lower the shovel within the vertical limits as determined by the length of the working stroke of the said cylinders and also the adjustment of the position of the levers 40—the hydraulic cylinders being of course provided with suitable connections 70 leading to the usual conventional master valve control (not shown).

The shovel 10 is provided with operating or thrust arms combined with latching or securing means for maintaining the shovel normally in substantially horizontal position within its carrying frame 18, as represented by the full lines in the drawings. This construction comprises a pair of bars 76 pivoted at 78 to the lower front corners of the shovel, and having their rear ends projecting over stop or limiting brackets 80 inside the rear corners of the frame 18 (see Figures 2 and 4). The extreme rear ends of the bars 76 operate slidingly between pairs of pins 82 which are carried by latch plates 84 that are secured to the opposite ends of a rocker shaft 86 journaled in blocks 85 at opposite rear corners of the frame 18. Thus said rear ends of the bars 76 are normally directed in position for abutting engagement against suitably inclined or wedge-shaped elements 77 carried by the rear transverse portion of the said frame 18, as represented in Figure 4 of the drawings. One of said latch plates 84 is provided with a curved and upwardly projecting arm 88, which is designed for manual operation. Intermediate its ends the rocker shaft 86 has fixed thereto a plate 90 carrying a sliding bolt 92 provided with a suitable spring 94, and arranged for abutting engagement with the rear side of the frame 18, in such a way as to maintain the latch plates 84 normally in latching relation to the bars 76 for supporting the latter in raised position, or as represented by the full lines in Figure 4. However, when said latch plates 84 are rocked about the axis of the shaft 86 to an extent sufficient to lower the extreme ends of the bars 76 in position to clear the lower edge of the frame 18 (as represented by the dotted lines in Figure 4), the shovel will thereby be released for vertical dumping movement about the axis of the pivots 14, as illustrated by the dotted lines in Figure 2; moreover, as said bars 76 slide rearwardly over the stop or limiting brackets 80, the shovel will become temporarily locked in such dumping position, due to engagement of the prongs or barbs 96 with the lower pins 82 and also with the transverse rear portion of the frame 18, as indicated by dotted lines in Figure 4. In the movement described, the action of the spring 94 (Fig. 5) is such as to maintain the lower pins 82 engaged with the lower edges of the bars 76, which permits the upper barbs 96 to clear the upper pins 82 as the bars 76 move rearwardly, while yielding to allow the lower barbs 96 to ride over the lower pins 82, after which said pin action brings the lower pins 82 into latching engagement with the lower barb elements 96 as represented by the dotted lines in Figure 4. Obviously the parts will be thus retained in this securely latched relation until the bars 76 are again released by the operator.

Each of the rear corners of the shovel is provided with a fixed rearwardly projecting arm 98, and normally these arms are both supported by the said rear transverse portion of the shovel-carrying frame 18. There is also provided an operating arm 100 pivotally connected with the arm 98, as indicated at 101, and extending forward into sliding engagement with a guide loop or keeper 102 at the upper end of one of the vertical posts 30, and into a position conveniently accessible from the driver's position on the tractor, for the purpose of controlling the latching means, and hence the dumping operation of the shovel.

In the operation of the apparatus, constructed as above described, the shovel or scoop member 10 is normally carried in horizontal position, as illustrated by the full lines in Figures 2 and 3; and for scooping purposes and thereby loading the shovel with the material, the shovel is carried in a more or less lowered position, as represented in Figure 2. In the travelling movement of the tractor, a driving thrust or pushing action is imparted to the shovel by the frame 18 engaging the rear ends of the bars 76, which have their forward ends attached to the opposite lower corners of the shovel, and all the parts being securely held in this operative relationship by the action of the latching means as shown in Figure 4. The raising and lowering of the shovel, into or out of its lowered working position (shown in Figure 2) is brought about by the operating action of the hydraulic cylinders 48 and their control connections, whereby the action of the hydraulic connections can be stopped at any desired point. Moreover the height to which the shovel may be raised and likewise the extent to which it will be lowered (and hence its working level) are controlled by regulating the levers 40 and changing the position thereof along the racks 42, whereby the set positions of the pistons or plungers of the cylinders 48 may be controlled and hence the limits of the forward and backward movements of said cylinders correspondingly regulated, as will be readily understood. It may also be pointed out that some variation of the working pitch of the shovel may be brought about by adjustment of the connections 33 at the upper ends of the brace arms 32 in an obvious manner.

In the operating of dumping the shovel member 10, the locking or latching means illustrated in Figure 4 may be released by the operator pushing forward the arm 88, or the same releasing operation may be accomplished by the driver, by pulling upward on the arm 100 (as indicated in Figure 2), whereby the latch plates 84 are moved into the position illustrated by the dotted lines in Figure 4 for bringing the rear ends of the bars 76 below the level of the cross frame portion of the shovel-carrying frame 18. The shovel member is thereby allowed to swing freely into dumping position as represented in Figure 2, and such dumping movement is of course limited by the action of the projections or barbs 96 which become temporarily locked by their engagement between the lower latch pins 82 and the said cross frame portion, as previously explained.

It will therefore be apparent that I have devised a practical and highly efficient arrangement and construction of apparatus for the carrying out of all the desired objects of my invention; and while I have illustrated and described one preferred form of embodiment of my proposed improvements, I desire to be understood as reserving the right to make such changes or modifications as may fairly fall within the scope of the appended claims.

Having thus described my invention, what I claim and desire to secure by Letters Patent is:

1. Power shovel apparatus for tractor operation, comprising a main supporting framework for mounting on the tractor, an adjustable auxiliary frame, a shovel supported by said auxiliary frame for dumping movement, operative thrust means connected with the front of the shovel and having abutting engagement with said auxiliary frame at the rear of the shovel, and hydraulic operating means mounted on said main framework and provided with connections for raising and lowering said auxiliary frame.

2. Power shovel apparatus for tractor operation, comprising a main supporting framework for mounting on the tractor, an auxiliary frame and shovel carried thereby for dumping movement, operative thrust bars pivoted to the front of said shovel and having abutting engagement with said auxiliary frame at the rear of the shovel, and shovel operating means supported by said main framework and provided with connections for raising and lowering said auxiliary shovel-carrying frame.

3. Power shovel apparatus for tractor operation, comprising a main supporting framework for mounting on the tractor, an auxiliary frame and shovel carried thereby for dumping movement, traction bars pivotally connecting said auxiliary frame with said main framework in front of said shovel, operative thrust bars pivotally connected to the front of said shovel and having releasable abutting engagement with said auxiliary frame at the rear of the shovel, and operating means carried by said main framework and provided with connections for raising and lowering said auxiliary shovel-carrying frame.

4. Power shovel apparatus for tractor operation, comprising a main supporting framework for mounting on the tractor, an auxiliary frame and shovel carried thereby for dumping movement, traction means pivotally connecting said auxiliary frame to said main framework in front of the shovel, combination latch and thrust bars connected with the front of said shovel and releasably connected with said auxiliary frame at the rear of the shovel, and means for releasing the rear ends of said bars to permit dumping operation of the shovel.

5. Power shovel apparatus for tractor operation, comprising a main supporting framework for mounting on the tractor, an auxiliary frame and shovel carried thereby for dumping movement, traction means pivotally connecting said auxiliary frame to said main framework in front of the shovel, operating means provided with connections for raising and lowering said auxiliary frame, combination latch and thrust bars connected with the front of said shovel and releasably connected with said auxiliary frame at the rear of the shovel, means for releasing the rear ends of said bars to permit dumping movement of the shovel, and means operable from the driver's position for controlling both said operating and said releasing means.

6. Power shovel apparatus for tractor operation, comprising a main supporting framework for mounting on the tractor, an auxiliary frame and shovel carried thereby for dumping movement, traction means pivotally connecting said auxiliary frame to said main framework in front of the shovel, combination latch and thrust bars connected with the front of the shovel and releasably connected with said auxiliary frame at the rear of the shovel, means for releasing the rear ends of said bars to permit dumping operation of the shovel, and means for latching said thrust bars to retain the shovel in its dumping position.

MAURICE GENGELBACH.

REFERENCES CITED

The following references are of record in the file of this patent:

UNITED STATES PATENTS

| Number | Name | Date |
|---|---|---|
| 2,268,689 | Andrus | Jan. 6, 1942 |
| 2,337,762 | Mott | Dec. 28, 1943 |
| 2,350,327 | Ender | June 6, 1944 |